United States Patent Office 3,347,498
Patented Oct. 17, 1967

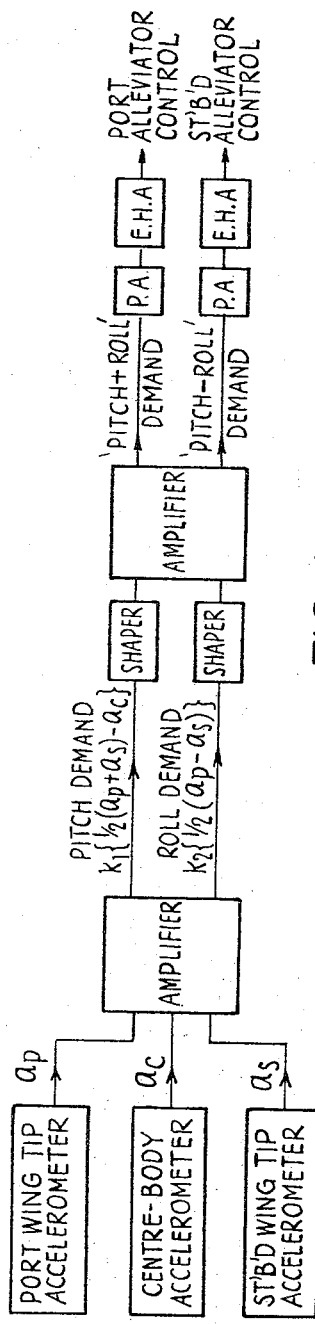
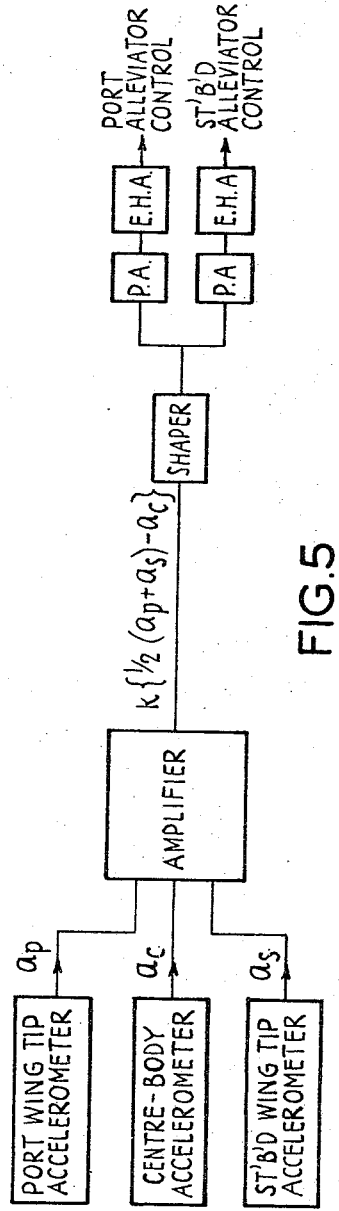
INVENTORS
ERIC PRIESTLEY
ANTHONY E. HODSON

3,347,498
AIRCRAFT STRUCTURAL STRESS ALLEVIATORS
Eric Priestley and Anthony E. Hodson, Lewisham, London, England, assignors to Elliott Brothers (London) Limited, Lewisham, London, England, a company of Great Britain
Filed Sept. 13, 1965, Ser. No. 486,699
Claims priority, application Great Britain, Sept. 16, 1964, 37,867/64
12 Claims. (Cl. 244—77)

ABSTRACT OF THE DISCLOSURE

Z-axis accelerometers on the wings and fuselage of an aircraft are used to sense flexural accelerations of the wings and to operate wing control surfaces to oppose such flexural accelerations.

---

This invention relates to a system for reducing peak wing stresses which occur in an aircraft structure due to carrying out $g$ manoeuvres or flying in rough air, or for means minimising the fatigue effects of manoeuvring or flying in rough air. The system is of particular value in the case of certain types of aircraft which are flown mainly at low altitudes.

In the preferred embodiment of the invention the aircraft is provided with lift-varying control surfaces, such as ailerons, at or near each wing tip and for the purposes of this specification such control surfaces will be referred to as "alleviators." The terms $x$-axis and $z$-axis will be used with their normal aerodynamic meaning, i.e., these axes are fixed in the plane of symmetry of the aircraft and are mutually perpendicular, the rolling or $x$-axis substantially coinciding with the fuselage datum line and the $z$-axis being the axis of yaw. By "structural fatigue damage" hereinafter employed, we mean the fraction of fatigue life expended. Structural fatigue life depends on the number of fluctuations in, e.g., aircraft wing root bending moment as well as the R.M.S. value of these fluctuations.

According to the invention a system for reducing stresses which occur in an aircraft structure comprises means for sensing the corresponding deflectional accelerations within the structure of the aircraft and means for signalling the accelerations so sensed to means which will actuate aerodynamic surfaces so as to alleviate these stresses.

The invention also includes apparatus for operating the system, such apparatus comprising three $z$-axis accelerometers substantially in the same position measured in the $x$-direction and located one in or near each wing tip and one in the plane of symmetry of the aircraft and computing and closed-loop servo systems arranged so that the output of the accelerometers operates alleviators in such a way as to alleviate structural stresses.

An aircraft having the system and apparatus of the invention is also included as being within the scope of the invention.

The preferred embodiment and variations thereof will now be described by way of example with reference to the accompanying drawings in which:

FIGURES 3, 4 and 5 are block diagrams showing different embodiments of the invention.

Figure 1:
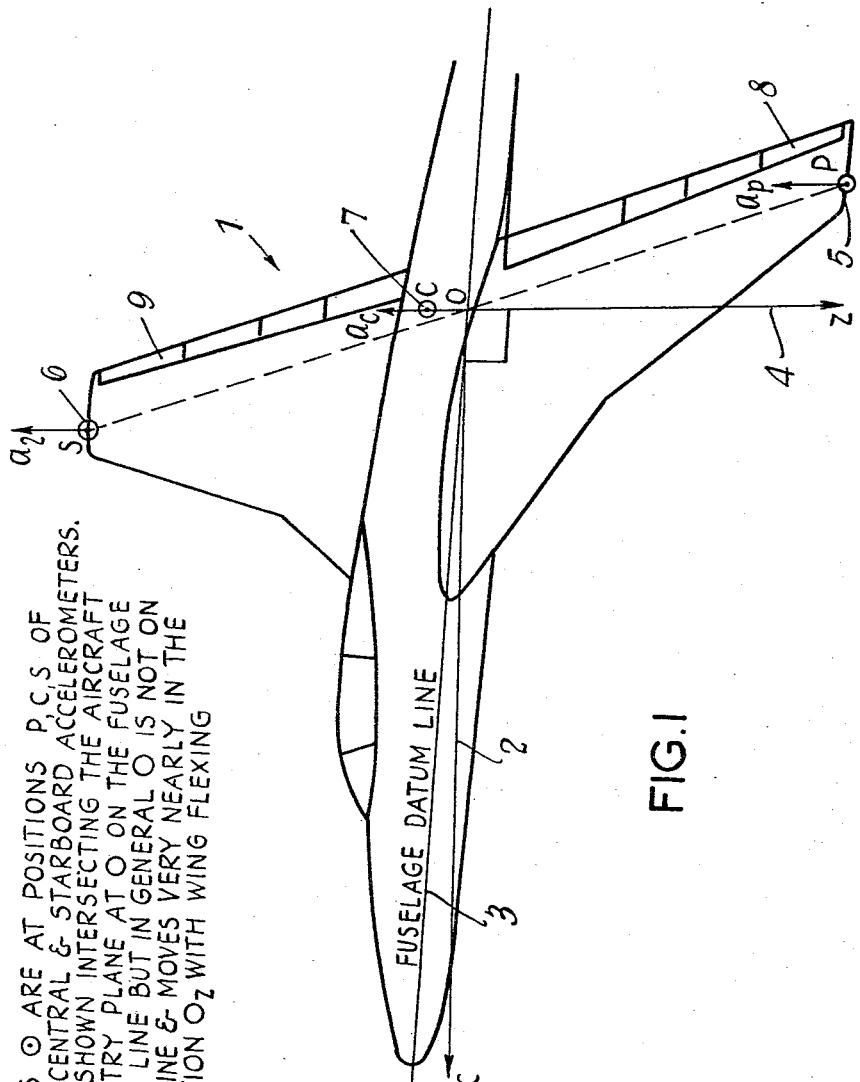
FIGURE 1 is a general view of an aircraft equipped with the alleviating system.

Referring to FIGURE 1 an aircraft is indicated in general 1. The $x$-axis 2 is shown as being inclined at a small angle to the fuselage datum line 3 and the $z$-axis 4 is perpendicular to the $x$-axis 2. Accelerometers 5, 6 and 7 are fitted at the port and starboard wing tips and in the plane of symmetry of the aircraft respectively so as to measure accelerations in a direction parallel to the $z$-axis. The accelerometers are substantially in the same position fore-and-aft, i.e., measured in the $x$-direction. Alleviators 8 and 9 are provided at the port and starboard wing tips respectively.

Figure 2:
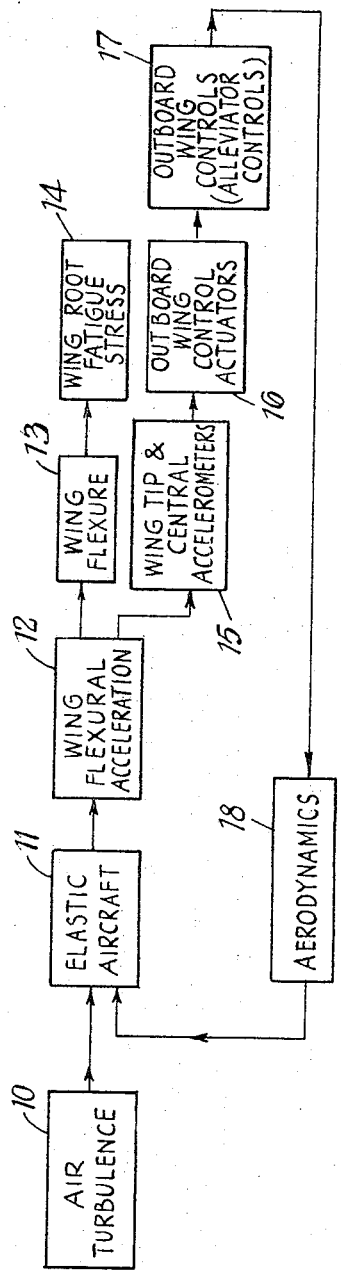
FIGURE 2 is a block diagram showing the overall principal of the invention.

In the block diagram, FIGURE 2, air turbulence 10 acts on an elastic aircraft 11 so as to produce wing flexural accelerations 12 leading the wing flexure 13 and resulting wing root fatigue stress 14. The closed alleviating loop is shown as starting from the aircraft 11 and proceeding through the wing flexural accelerations 12, the wing tip and central accelerometers 15, the alleviator actuators 16, the alleviators 17, the aircraft aerodynamics 18 and back to the aircraft 11.

Denoting the outputs of the port, starboard and central accelerometers by $a_p$, $a_s$, and $a_c$, respectively, then for a hypothetical structurally inflexible aircraft in symmetrical flight $a_p = a_s = a_c$. As a result of the structural compliance, specifically wing bending, of an actual aircraft the values $a_p$ and $a_s$, equal as before, now differ from $a_c$ and the equal differences $a_p - a_c$ and $a_s - a_c$ are measures of wing bending and may be used to deflect the alleviators in the sense to reduce this bending. The fact that the "flexural accelerations" $a_p - a_c$, $a_s - a_c$ have 180° phase advance relative to wing flexural deflection or wing root bending moment, and that only a very small (aerodynamic) lag exists between change of alleviator control angle and the corresponding change of local wing lift, enables such deflection of the aleviators to reduce fluctuations in wing root bending moment. The symmetrical flight case is an abstraction and in practice the signals $a_p - a_c$, $a_s - a_c$ will differ due to aircraft angular acceleration in roll or to excitation of anti-symmetric wing bending modes.

Figure 3:
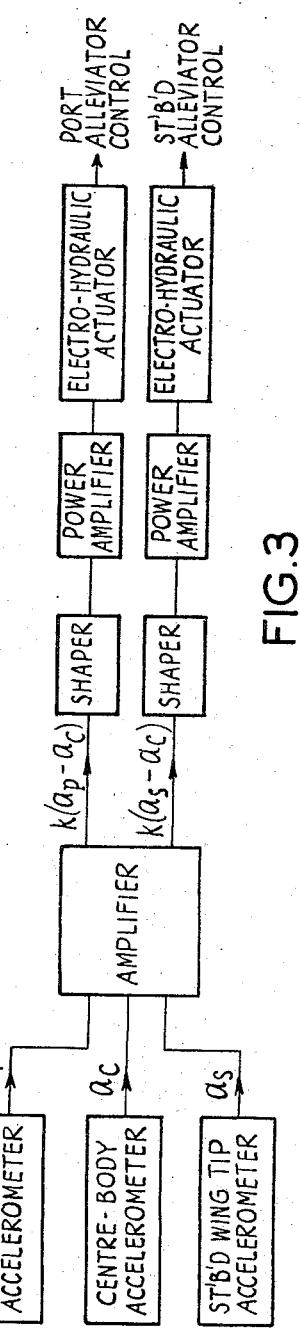

FIGURE 3 shows diagrammatcially one way of performing the invention, in which the port and starboard alleviator control demands are $k(a_p - a_c)$ and $k(a_s - a_c)$ respectively before shaping. FIGURE 4 shows another way of performing the invention in which the demands are initially for pitchwise alleviator control angles of $k_1[½(a_p + a_s) - a_c]$ and rollwise alleviator control angles of $k_2[½(a_p - a_s)]$ but the demands for port and starboard alleviator control angles must again separately be computed and fed to the respective electrohydraulic actuators. This way is more complex than the first, being equivalent to it only if $k_1 = k_2 = k$ when "pitch+roll" demand becomes $k(a_p - a_c)$ and "pitch−roll" demand $k(a_s - a_c)$. In the general case where $k_1$ and $k_2$ are unequal the demands for port and starboard alleviator angles are respectively $$½(k_1 + k_2)a_p + ½(k_1 - k_2)a_s - k_1 a_c$$

and $$½(k_1 - k_2)a_p + ½(k_1 + k_2)a_s - k_1 a_c$$

shaping apart.

This extra complication is reflected in the enhanced flexibility whereby the gains $k_1$ and $k_2$ in the pitch and roll channels respectively are at choice whereas in the first system these gains are essentially equal.

The special case $k_2 = 0$ is noteworthy; the demands to both alleviators are then $k_1[½(a_p + a_s) - a_c]$, shaping apart, and are thus purely pitchwise. The demands of this type of control are most simply met by the arrangement shown in FIGURE 5.

It will be appreciated that in FIGURES 3, 4 and 5 the details of known servo art such as feedback loops have been omitted for the sake of clarity. The values of the gains $k$, $k_1$ and $k_2$ and the detailed design of the shapers, usually in the form of RC filters, are chosen to give optimum alleviation in each application but these choices are not quantitatively critical.

All embodiments of the system have the advantage that the operation is unaffected by either a constant $g$ as in steady turning flight or by an angle of climb or descent, the system having high-pass characteristics by virtue of the manner in which the accelerometer outputs are differenced. Operation is also unaffected by angular velocities of pitch and roll which are not "seen" by the accelerometers. Angular acceleration in pitch gives a negligible alleviator demand because, as previously stated, the three accelerometers are substantially in the same fore-and-aft position.

In addition to alleviation of wing root bending moment there is a reduction of wing root shear stress via the lift change due to movement of the alleviators. If greater alleviations of bending moments or shear stresses, particularly the latter, are required then one or more sets of controls inboard of the alleviators described may be operated in sympathy, completely or only pitchwise, with the alleviators.

Operation of the alleviators has virtually no effect on the pitching of the aircraft whose natural frequency is very much lower than the natural frequency of wing flexure alleviated by means of the invention. Hence the invention may be operated in conjunction with a pitch autostabiliser system with negligible coupling between the two whether they use the same or different control surfaces.

Operation of the invention brings about a large increase in damping of the wing first bending mode (nodes near the roots) with an accompanying reduction in frequency. The acceleration response of the aircraft to an isolated gust is thereby reduced, as also is the first peak of consequent wing bending.

In rough air there is a significant reduction in both the average (root mean square) fluctuation of the wing root bending moment about the calm air value and in the frequency of fatigue-generating fluctuations of this load.

In manoeuvres where $g$ is applied by the pilot or autopilot the invention reduces the peak values and fluctuations of wing root bending moment without affecting however the fundamental aircraft stability and control characteristics—in particular the values of stick movement and force per $g$ are unaltered.

We claim:

1. In a system for reducing flexure of an aircraft structure to correspondingly reduce stress fatigue damage which would otherwise occur in the structure as a result of repeated stressing thereof, the aircraft including a portion relative to which said structure may flex, and control means operable to oppose such stress-inducing flexure, and there being actuating means for said control means; said system including, in combination, first and second acceleration sensing means, each having an output proportional to the magnitude of acceleration sensed, said first sensing means being positioned to respond to acceleration of said portion relative to which said structure may flex which is along an axis parallel to the direction of such relative flexure, said second sensing means being positioned to respond to acceleration of said structure which is along an axis parallel to and offset from the first mentioned axis, and means connected between said sensing means and said actuating means and having an output to said actuating means which is proportional to the acceleration of said structure relative to said portion to oppose the flexural acceleration of said structure which is implied by such relative acceleration.

2. A system for reducing structural fatigue damage which would otherwise occur in an aircraft structure as a result of repeated stressing of the structure, comprising first, second and third $z$-axis accelerometers substantially in the same position measured in the $x$-direction, said first accelerometer being located in the region of the port wing tip of the aircraft, said second accelerometer being located in the plane of symmetry of said aircraft and said third accelerometer being located in the region of the starboard wing tip of the aircraft, and computing and closed loop servo systems arranged so that the output of said accelerometers causes operation of alleviators to oppose flexural accelerations associated with the stressing of the aircraft structure.

3. A system for reducing structural fatigue damage which would otherwise occur in an aircraft structure as a result of repeated stressing of the structure, comprising first, second and third $z$-axis accelerometers substantially in the same position measured in the $x$-direction, said first accelerometer being located in the region of the port wing tip of the aircraft, said second accelerometer being located in the plane of symmetry of said aircraft and said said third accelerometer being located in the region of the starboard wing tip of said aircraft, an amplifier into which the outputs of said first, second and third accelerometers are fed, a first output from said amplifier for providing a first signal to operate a port alleviator, a second output from said amplifier for providing a signal to operate a starboard alleviator, first and second shapers through which the signals from said first and second outputs pass respectively, first and second power amplifiers for the outputs of said first and second shapers respectively and first and second electrically controlled actuators actuated respectively by the outputs from said first and second power amplifiers to operate alleviators in such a way as to oppose flexural accelerations associated with the stressing of the aircraft structure.

4. A system for reducing structural fatigue damage which would otherwise occur in an aircraft structure as a result of repeated stressing of the structure, comprising first, second and third $z$-axis accelerometers substantially in the same position measured in the $x$-direction, said first accelerometer being located in the region of the port wing tip of the aircraft, said second accelerometer being located in the plane of symmetry of said aircraft and said third accelerometer being located in the region of the starboard wing tip of said aircraft, a first amplifier into which the outputs of said first, second and third accelerometers is fed, a first output from said first amplifier providing a signal which relates to pitchwise alleviator demand, a first shaper into which said signal from said first output passes, a second output from said first amplifier providing a signal which relates to rollwise alleviator demand, a second shaper into which said signal from said second output passes, a second amplifier into which is fed the outputs of said first and second shapers, a first output from said second amplifier for providing a signal to operate a port alleviator, a second output from said second amplifier for providing a signal to operate a starboard alleviator, first and second power amplifiers through which the signals from said first and second outputs respectively of said second amplifier pass, and first and second electrically controlled actuators, actuated respectively by the outputs from said first and second power amplifiers to operate the alleviators in such a way as to oppose flexural accelerations associated with the stressing of the aircraft structure.

5. A system for reducing structural fatigue damage which would otherwise occur in an aircraft structure as a result of repeated stressing of the structure, comprising first, second and third $z$-axis accelerometers substantially in the same position measured in the $x$-direction, said first accelerometer being located in the region of the port wing tip of the aircraft, said second accelerometer being located in the plane of symmetry of said aircraft and said third accelerometer being located in the region of the starboard wing tip of said aircraft, an amplifier into which the outputs of said first, second and third accelerometers are fed, a single output from said amplifier, a shaper into which the signal from said output of said amplifier is fed, first and second outputs from said shaper, first and second power amplifiers through which the signals from said first and second outputs from said shaper pass respectively, a first electrically controlled actuator actuated by the signal from said first power amplifier to operate a port alleviator and a second electrically controlled actuator actuated by the signal from said second power amplifier to operate a starboard alleviator, the alleviators being so operated as to oppose flexural accelerations associated with the stressing of the aircraft structure.

6. In a system for reducing flexure of an aircraft structure to correspondingly reduce stress fatigue damage which would otherwise occur in the structure as a result of repeated stressing thereof, the aircraft including a portion relative to which said structure may flex, said structure including control means operable to deflect the structure in opposition to the stress-inducing flexure, and there being actuating means for said control means; said system including, in combination, first and second acceleration sensing means, each having an output proportional to the magnitude of acceleration sensed, said first sensing means being positioned to respond to acceleration of said portion relative to which said structure may flex which is along an axis parallel to the yaw axis of the aircraft, said second sensing means being positioned to respond to acceleration of said structure which is along an axis parallel to and offset from the first mentioned axis, and means connected between said sensing means and said actuating means and having an output to said actuating means which is proportional to the acceleration of said structure relative to said portion to oppose the flexural acceleration of said structure which is implied by such relative acceleration.

7. In an aircraft having a fuselage and port and starboard wings attached to said fuselage, a system for reducing flexure of said wings relative to said fuselage to correspondingly reduce stress fatigue damage which would otherwise occur as a result of repeated stressing of said wings, each wing having control means operable to deflect the wing in opposition to the stress-inducing flexure, and there being actuating means for said control means; said system including, in combination, first, second and third accelerometers positioned respectively on said port wing, said fuselage and said starboard wing, and each being oriented to sense acceleration along an axis parallel to the yaw axis of the aircraft so that the outputs of said accelerometers are proportional to the magnitudes of the sensed accelerations, and means connecting the outputs of said accelerometers to said actuating means for operating said control means to oppose those outputs indicative of wing flexure relative to said fuselage.

8. The system according to claim 7 wherein the outputs of said accelerometers are respectively $a_p$, $a_c$ and $a_s$, the last mentioned means having outputs to said control means which are in the form:

$k_1(a_p - a_c)$, and
$k_2(a_s - a_c)$ when $k_1$ and $k_2$ are constants.

9. The system according to claim 7 wherein the outputs of said accelerometers are respectively $a_p$, $a_c$ and $a_s$, the last mentioned means having outputs to said actuating means which are in the form:

$k_1[\frac{1}{2}(a_p + a_s) - a_c]$, and
$k_2[\frac{1}{2}(a_p - a_s)]$ when $k_1$ and $k_2$ are constants.

10. The system according to claim 7 wherein the outputs of said accelerometers are respectively $a_p$, $a_c$ and $a_s$, the last mentioned means having an output to said actuating means which is in the form:

$k[\frac{1}{2}(a_p + a_s) - a_c]$ when $k$ is a constant.

11. A system for reducing structural fatigue damage which would otherwise occur in an aircraft structure as a result of repeated stressing of the structure, there being alleviators to oppose such stressing, said system comprising:

first, second and third z-axis accelerometers for sensing flexural accelerations associated with such stressing, and computing and closed loop servo systems which receive signals developed by said accelerometers and are responsive to such signals to actuate said alleviators to oppose such flexural accelerations.

12. A system for reducing structural fatigue damage which would otherwise occur in an aircraft structure as a result of repeated stressing of the structure, which comprises:

a first z-axis accelerometer supported by the port wing of the aircraft, a second z-axis accelerometer supported at a position in the plane of symmetry of the aircraft, a third z-axis accelerometer supported by the starboard wing of the aircraft, actuator means for actuating aerodynamic surfaces of the wings, and computing and closed loop servo systems which receive signals developed by the accelerometers and are responsive to such signals to cause operation of the actuator means to oppose z-axis flexural accelerations of the wings as computed from the signals developed by the accelerometers.

References Cited

UNITED STATES PATENTS

| | | | |
|---|---|---|---|
| 2,286,150 | 6/1942 | Mercier | 244—76 |
| 2,866,933 | 12/1958 | Bond et al. | 244—77 |
| 3,062,487 | 11/1962 | Abichandani | 244—77 |

MILTON BUCHLER, *Primary Examiner.*

B. BELKIN, *Assistant Examiner.*